Nov. 10, 1942.  E. O. SCHNETZ  2,301,461
YEAST EMULSIFIER
Filed July 31, 1939
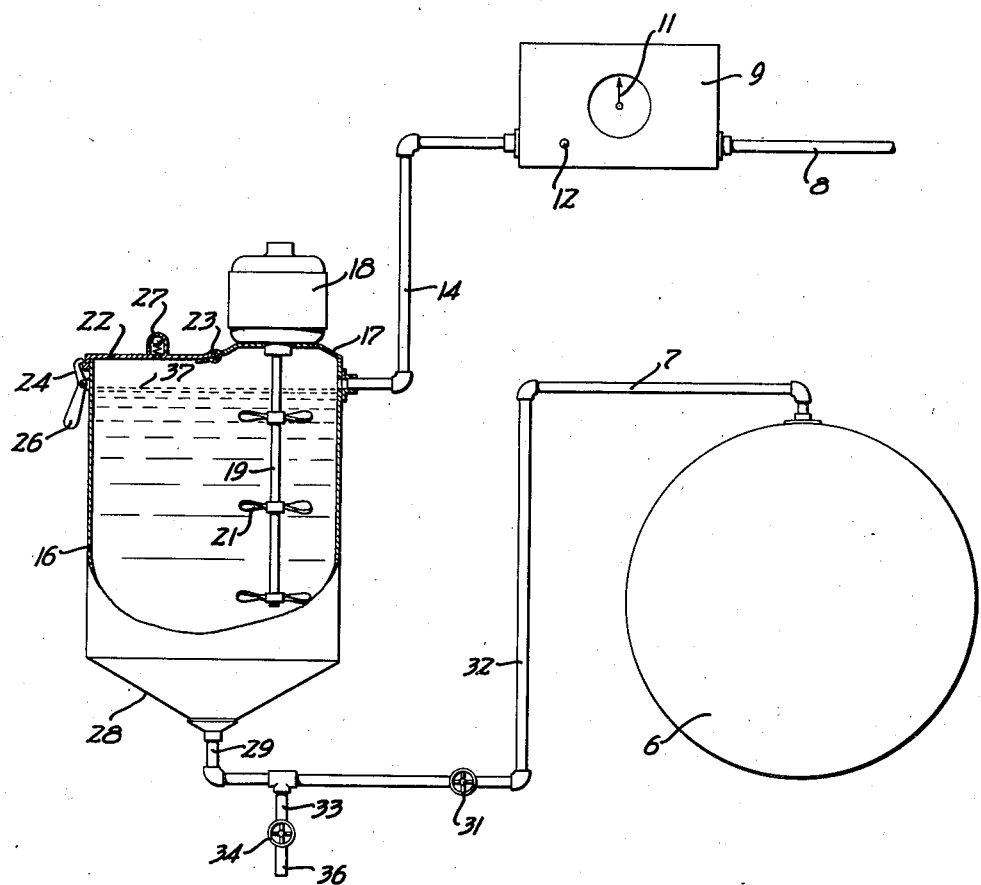
INVENTOR
EARL O. SCHNETZ
BY Marcus Lothrop
ATTORNEY

Patented Nov. 10, 1942

2,301,461

UNITED STATES PATENT OFFICE 2,301,461

YEAST EMULSIFIER

Earl O. Schnetz, Sacramento, Calif.

Application July 31, 1939, Serial No. 287,587

7 Claims. (Cl. 259—7)

My invention relates to the facilitation of bread baking operations in particular, and generally relates to improvements in the utilization of yeast and comparable material. In the baking of bread it is customary to have a container in which the various ingredients are mixed and to add to such container at an appropriate time a measured quantity of water and separately to make by hand a mixture of yeast and water and add such separate mixture to the container, following which, by working of the ingredients, a dough is produced.

Another object of my invention is to provide a mechanism for facilitating the emulsification of yeast.

Another object of my invention is to provide a means for automatically combining yeast with other ingredients for making bread.

Another object of my invention is in general to improve yeast emulsifiers.

In the drawing the figure is a diagrammatic representation of a yeast emulsifier constructed in accordance with my invention, parts being shown diagrammatically in cross-section on a vertical axial plane, also to illustrate the process.

In its preferred form, the yeast emulsifier of my invention includes a mixing chamber which is included in a liquid line extending between a liquid measuring device and a container for the bread ingredients, the mixing chamber being provided with a closure through which yeast can be introduced and being likewise provided with an agitator for mixing contained liquid and yeast. The emulsifying process includes agitating yeast and water together to provide a mix and then incorporating the mix with a predetermined amount of flowing water.

While a large number of variations of technique in practising the method of my invention and in embodying the mechanism can be effectuated, the disclosure herein is of a form of carrying out the process and embodying the mechanism which has proved highly successful in practice.

In the preferred embodiment there is appropriately located a container 6 within which various ingredients are mixed to provide the bread dough. This container is substantially a standard piece of equipment in a bakery and therefore is not described in detail. It ordinarily is supplied with water for mixing through a conduit 7 leading into the upper portion of the container 6 and, in standard installations prior to my invention, connected to a source conduit 8 leading through a measuring device 9. This is appropriately a flow meter which is provided with an indicating dial 11 and a control button 12 so that a predetermined amount of water can normally be passed from the source conduit 8 through the conduit 7 into the container 6. The flow meter 9 is likewise a standard piece of equipment heretofore directly connected to the container 6 and is normally utilized automatically to supply to the container an amount of water measured in pounds.

In accordance with my invention, I do not provide a direct connection between the flow meter 9 and the container 6 but rather from the flow meter provide a conduit 14 which is connected into the upper portion of a mixing chamber 16. This chamber is a circular-cylindrical body preferably fabricated of metal and situated in a location so that its extent is approximately the same vertically as that of the conduit 7. The mixing chamber is entirely closed except for the various pipe connections thereto and except for its top. The top is provided with a cover 17 which extends partially thereacross and is permanently fixed in position affording a tight seal. On the cover 17 there is mounted a motor 18, such as an electric driving motor, having an extended shaft 19 disposed eccentrically of the circular-cylindrical chamber 16 and carrying a plurality of agitators 21, so that when the motor 18 is energized the agitators 21 produce a turbulent flow within the mixing chamber 16. Since the agitator is disposed eccentrically thereof, a true vortex does not form, thereby increasing the agitating and mixing properties of the structure.

Supplementing the partial cover 17 to close the chamber is a closure 22 which is substantially a plate completing the circular contour of the cover 17 and which is articulated to such cover by a spring hinge 23, the effect of the spring being to urge the closure 22 toward open position. To hold the closure in closed position there is afforded a latch 24 with an operating handle 26 thereon, so that the closure 22 can be clamped to the chamber 16 in liquid-tight relationship, permitting the pressure within the chamber to become somewhat greater than atmospheric pressure. So that the pressure can be reduced to atmospheric pressure and even maintained at atmospheric pressure in the event of a tendency to form a vacuum, I mount on the closure 22 an inwardly operating air check valve 27.

The bottom portion of the mixing chamber 16 preferably is formed by a cone 28 from the center of which an outlet conduit 29 extends through a valve 31 to a pipe 32 connected to the pipe 7. Also joined to the conduit 29 is a discharge duct 33 controlled by a valve 34 and leading to a waste pipe 36.

In the operation of the structure, the valve 34 is closed and the valve 31 can be either opened or closed, and water is permitted to run in through the source pipe 8 and the flow meter 9 through the conduit 14 into the mixing chamber 16. With the closure 22 in open position, water rises within the container to the level 37 which is the level established by the vertical extent of the pipe 7. This is substantially adjacent the top of the mixing chamber 16. At this point the water flow is interrupted and the yeast in solid form is introduced into the mixing chamber 16 through the open closure 22. Also introduced is a yeast food, which is a standard admix for the yeast.

The closure 22 is then shut by operating against the spring 23, and the latch 24 is manipulated by operation of the handle 26 to keep the closure 22 in liquid-tight position. Thereupon the motor 18 is energized to revolve the agitator 21 and a very thorough emulsion of the yeast is thereby formed. At the conclusion of this operation, which takes approximately five minutes, the agitator motor 18 is preferably shut off, but, if desired, it can be permitted to run. Then the valve 31 is either opened or remains in open position, and the flow meter 9 is operated by manipulation of the control 12 to permit the passage of a predetermined amount of water. The water then flowing through the meter 9 passes through the conduit 14 and through the mixing chamber 16, carrying with it the yeast emulsion out through the outlet 29, through the pipe 32 and the conduit 7 into the container 6. When the measured or predetermined amount of water has passed through the mixing chamber 16, substantially the entire yeast content or mix therein has been carried over with the stream of flowing water into the container 6.

The flow is stopped automatically by the flow meter 9 when the predetermined amount of water has passed. Even though during the water flow the pressure within the container 16 may have exceeded atmospheric pressure, when the flow is stopped the check valve 27 can open, and the liquid level within the mixing chamber 16 falls to the level 37 coextensive with the vertical height of the conduit 7, so that a body of liquid remains trapped within the mixing chamber. Then, when the handle 26 is operated and the closure 22 is again opened, there remains within the mixing chamber a body of liquid ready for addition of a subsequent yeast charge.

At the conclusion of a number of cycles of operation as described, the valve 31 is closed and the valve 34 opened. A quantity of water is then introduced through the pipe 14 from the source pipe 8 through the flow meter 9, to flush the entire interior of the mixing chamber and of the conduits, the flushed material passing out through the waste pipe 36.

In this fashion the yeast is emulsified automatically and is added to the ingredients within the container 6 with virtually no more attention than is now necessary simply to add the measured amount of water through the flow meter 9.

I claim:

1. A yeast emulsifier comprising a normally closed mixing chamber, a container, an outlet conduit from said chamber to said container, said conduit providing a trap to establish a predetermined liquid level in said mixing chamber, a liquid inlet conduit to said mixing chamber effective to increase the pressure within said mixing chamber above atmospheric pressure, liquid-tight means affording access to said mixing chamber, and an agitator in said mixing chamber for mixing liquid and material introduced through said access means.

2. A yeast emulsifier comprising a closed mixing chamber, a container, an outlet from said chamber to said container, said outlet forming a liquid trap to normally maintain liquid in said chamber at a predetermined level, means for supplying a measured amount of liquid to said chamber effective to increase the pressure within said chamber above atmospheric pressure, means for admitting material to said chamber, and means in said chamber for mixing said material with liquid.

3. In bakery apparatus including a container for dough ingredients and a source of liquid, the combination of a mixing chamber, a conduit for intermittently passing liquid from said source to said mixing chamber, another conduit communicating said mixing chamber with said container for intermittently passing liquid and other products from said chamber to said container, said last-mentioned conduit forming a trap to normally establish a quantity of liquid in said chamber, means for introducing yeast or the like to said chamber and means for emulsifying the yeast so introduced and the liquid maintained in said chamber by said trap, the said emulsifying means being adapted to operate alternatively with the flow of liquid through said conduits whereby a yeast emulsion may be created in said mixing chamber prior to flow of liquid to said container and passed to said container during flow of liquid to said container through said mixing chamber.

4. In bakery apparatus including a container for dough ingredients and a flow meter for measuring a predetermined quantity of liquid to be passed to said container, the combination of a mixing chamber, a conduit for intermittently passing liquid from said flow meter to said mixing chamber, another conduit communicating said mixing chamber with said container for intermittently passing liquid and other products from said chamber to said container, the said last-mentioned conduit forming a trap to normally establish a predetermined quantity of liquid in said chamber, means for introducing yeast or the like to said chamber and an agitator in said chamber to emulsify the yeast so introduced and the liquid maintained in the chamber by said trap, the said agitator being adapted to operate alternatively with the flow of liquid through said conduits whereby a yeast emulsion may be created in said mixing chamber prior to flow of liquid to said container and passed to said container during flow of liquid to said container.

5. In bakery apparatus including a container for dough ingredients and a flow meter for measuring a predetermined quantity of liquid to be passed to said container, the combination of a mixing chamber, a conduit extending from said flow meter to the upper portion of said mixing chamber for intermittently passing liquid from said meter to said chamber, another conduit extending from the lower portion of said mixing chamber to the upper portion of said container for intermittently passing liquid and other products from said chamber to said container, the said last-mentioned conduit forming a trap to normally establish a predetermined quantity of liquid in said chamber, means for introducing yeast or the like to said chamber and an agitator in said chamber for emulsifying the yeast so introduced and the liquid maintained in the chamber by said trap, the said agitator being adapted to operate alternatively with the flow of liquid through said conduits whereby a yeast emulsion may be created in said mixing chamber during the interval between flows of liquid to said container and passed to said container during liquid flow to said container.

6. A yeast emulsifier comprising a mixing chamber, a container, means for hermetically closing said mixing chamber, a pipe extending from the bottom of said chamber to said container and rising nearly to the height of said chamber to form a trap, means for flowing a measured amount of liquid through said chamber and said pipe to said container, and means for admitting air to said chamber in response to sub-atmospheric pressure therein.

7. A yeast emulsifier comprising a container for bread dough ingredients, a mixing chamber, a cover for said mixing chamber adapted to form a tight closure and to be opened for access to the interior of said mixing chamber, an air inlet valve on said mixing chamber, means for agitating the contents of said mixing chamber, a pipe leading from the bottom of said mixing chamber then rising nearly to the height of said mixing chamber to form a liquid trap, and finally connecting to said container, a conduit leading from a liquid supply into said mixing chamber, and a liquid meter in said conduit whereby a predetermined quantity of material can be conducted from said mixing chamber through said pipe into said container by metering a similar predetermined quantity of liquid through said conduit.

EARL O. SCHNETZ.